United States Patent Office 3,411,643
Patented Nov. 19, 1968

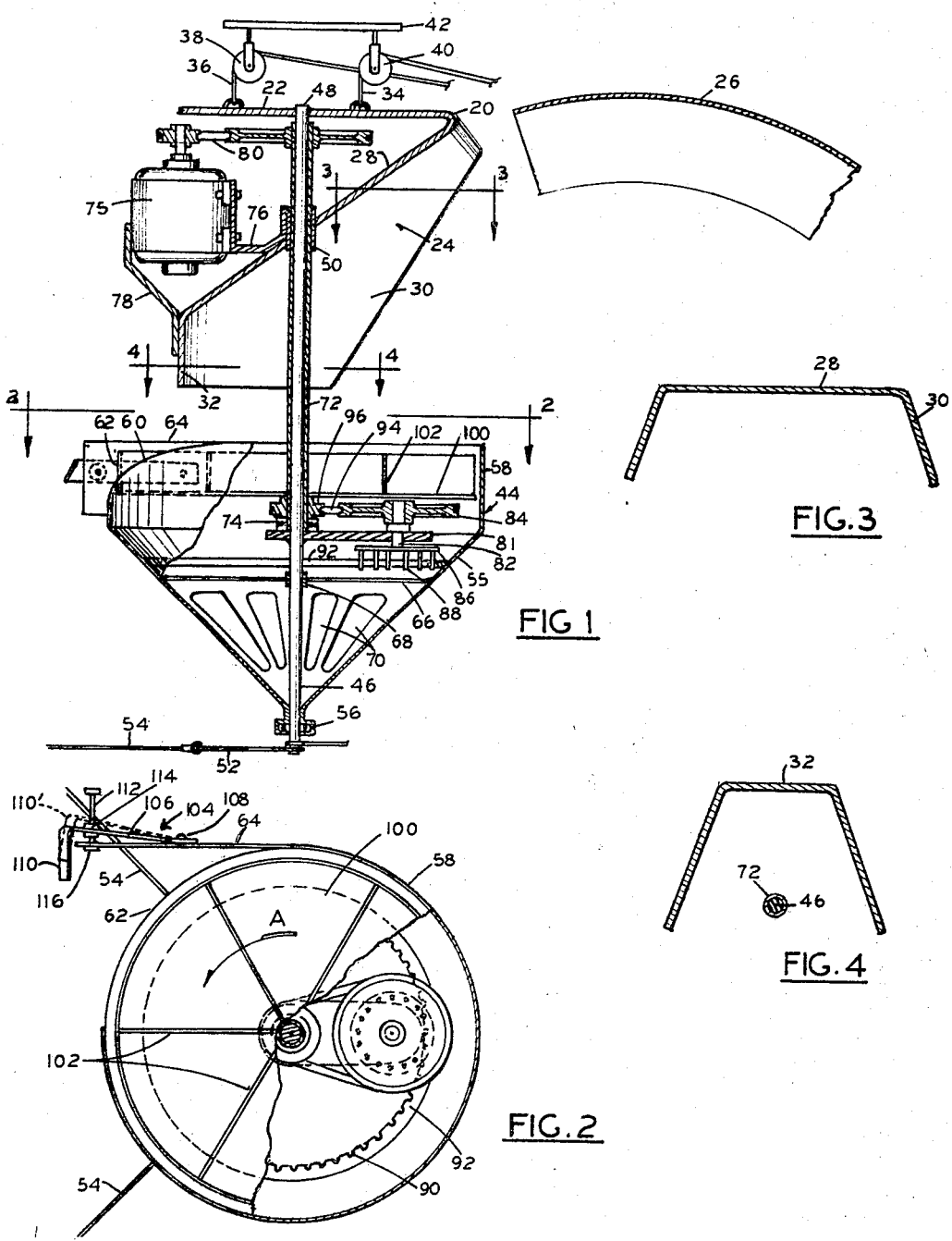

3,411,643
SILAGE DISTRIBUTOR
Hermann K. Cymara, R.F.D. 2, Newfield, N.Y. 14867
Filed July 15, 1966, Ser. No. 565,545
9 Claims. (Cl. 214—17)

ABSTRACT OF THE DISCLOSURE

Sillage distributor having a vertical support rod with an inverted chute on its upper end for receiving silage from a silage supply spout and deflecting silage received in the chute downwardly, and a distributor disposed below the spout in a position to receive deflected silage the distributor having a rotary impeller mounted on a tubular drive shaft rotatable on the rod and a rotary housing coaxially disposed around the impeller and having a discharge opening tangentially disposed in relation to the impeller, a motor at the upper end of the rod to rotate the impeller and pin wheel gearing to rotate the housing at a lower speed than the impeller.

---

This invention relates to distributors for silage during the filling of a silo, and also grain and the like.

In filling a silo of substantial height and diameter, the silage is generally blown to the upper end of the silo through a conduit, which is provided with a downwardly directed or inclined discharge spout at the upper end. The build up of silage within the silo from such practice is uneven, and often builds up against one side of the silo. Such uneven build up renders it difficult to remove the silage, and wastes a part of the storage capacity of the silo, if filled gradually and evenly.

The present invention is directed to a distributor adapted to be hung centrally within the silo in position to receive the discharge of the spout, and thereafter distribute the silage evenly as the silo is filled. The invention contemplates a centrally located distributor having a tangential discharge which rotates, and which may include a deflector to establish a uniform distribution over the entire circular area of the silo.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 1 is a side view with parts in section;
FIGURE 2 is a sectional view taken from the line 2—2 of FIGURE 1, with parts broken away;
FIGURE 3 is a sectional view taken on the line 3—3 of FIGURE 1, and
FIGURE 4 is a sectional view taken on the line 4—4 of FIGURE 1.

Referring to FIGURE 1, the distributor apparatus comprises a support 20 having an upper plate portion 22, and an inverted guide chute 24 therebelow, adapted to receive silage from a silage supply spout 26 disposed in supplying relation thereto. The chute 24 comprises an inclined section 28 having side wings, one of which is indicated at 30, and a downwardly directed deflecting element 32. The support may be hung by cables 34 and 36 passing over pulleys 38 and 40 suspended from any suitable supporting structure located above in the silo, as indicated at 42, so that the apparatus may be elevated into position as necessary.

The chute guides silage upon a distributor 44 located therebelow. The distributor is supported upon a rod 46 affixed at its upper end in the plate portion 22, as indicated at 48, and extends through an aperture having a sleeve bearing 50 in the chute section 38. The lower end of the rod 46, below the distributor 44, is provided with one or more arms such as at 52, to which cables 54 may be attached to stabilize and hold the rod substantially vertical, such cables being attached at their other ends to the silo walls in any suitable manner.

Rotatably mounted on the rod 46, and supported from the rod upon a thrust bearing 56 is a conical rotatable distributor housing 55, having at its upper end, an annular upstanding flange 58, the flange being cut away as at 60 to provide a tangential discharge opening as at 62, the flange being extended tangentially as at 64 for this purpose. Tht housing is stabilized by a spider 66 having a bearing 68 on the rod, and the conical lower portion of the housing is provided with a series of large openings 70, to allow any spillage of silage into the lower part of the housing to fall through.

A tubular shaft 72 is disposed about the rod 46, which shaft is journalled in the sleeve bearing 50 and is supported at its lower end upon a thrust bearing 74, mounted on the rod 46 above a bracket 81 affixed to the rod. Such tubular shaft 72 is driven by a motor 75 mounted on brackets 76 and 78 affixed to the support 20, a belt and pulley reduction drive 80 being provided.

The lateral arm or bracket 81, affixed to the rod 46, immediately below the thrust bearing 74, has journalled in its outer end a stub shaft 82 having a pulley 84 above the arm, and a planetary pin wheel pinion 86 below. The pins 88 of the pinion 86 mesh with the internal teeth 90 of an internal gear 92 affixed to the internal wall of the conical portion of the distributor housing. The pulley 84 is driven by a belt 94, in turn driven by a small pulley 96 affixed to the lower end of the tubular shaft 72, immediately above the thrust bearing 74.

Above the pulley 84 is a circular plate 100, affixed to the tubular shaft 72, such plate having a plurality of vertical distributing vanes 102 radially disposed thereon. Such plate with its vanes acts as an impeller and rotates within the housing flange 58, at the speed of tubular shaft 72 and discharges silage falling thereon from the chute 20 and spout 26, tangentially through the opening 62. Any deflector such as indicated at 104 may be applied to the outer end of the flange extension 64 and may be shaped or formed to provide a suitable distribution pattern in regard to the silage centrifugally thrown tangentially outward through the opening and along the flange extension 64.

Such deflector may comprise an arm 106 secured to the extension 64 as at 108. The end of the deflector has a right angle inclined portion 110 for deflecting tangentially discharged material downwardly toward the center. The extent to which the deflector acts may be adjusted by a handscrew 112 threaded in the arm 106, as at 114 and having its end swivelly secured as at 116 in the extension 64, whereby the deflector can be moved to varying positions, for example as is indicated at 110′, the arm 106 being sufficiently resilient or flexible for this purpose.

While the distributing plate or impeller is rotating with the tubular shaft 72 at shaft speed, in the direction of arrow A, the housing 55 is also rotating, but at a lower speed through the planetary drive, and in the direction of arrow A, and thus the tangential discharge of silage is caused to rotate to provide an even build up of silage as desired in the silo below.

While a single form of the invention has been illustrated and described, it is to be understood that the invention is not limited thereto. As various changes in the construction and arrangement may be made without de-

What is claimed is:

1. A silage distributor comprising a support having a depending non-rotating rod, and having an inverted chute secured to the upper end of the rod for receiving silage from a silage supply spout and deflecting silage received in the chute downwardly, and distributor means disposed below said spout in a position to receive deflected silage, said distributor means comprising a rotary impeller having a circular plate and radial blades affixed thereto and journalled on said rod, a rotary housing coaxially disposed around the impeller and journalled on the lower end of said rod and having a discharge opening tangentially disposed in relation to said impeller, and power means to rotate the impeller mounted on said support, and means affixed to said rod below said impeller plate and above the lower end of the rod and including reduction gearing for driving said housing at a lower speed than said impeller.

2. A silage distributor according to claim 1 wherein the housing is driven from the impeller by a planetary drive.

3. A silage distributor according to claim 1 wherein the impeller is affixed to the lower end of a tubular drive shaft disposed about the rod and in which the upper end of the drive shaft is driven from the motor mounted on the support.

4. A silage distributor according to claim 2 wherein the impeller is affixed to the lower end of a tubular drive shaft disposed about the rod, and in which the upper end of the drive shaft is driven from a motor mounted on the support.

5. A silage distributor according to claim 2 wherein the planetary drive comprises a pin wheel pinion meshing with an internal ring gear affixed to the housing.

6. A silage distributor according to claim 4 wherein the planetary drive comprises a pin wheel pinion meshing with an internal ring gear affixed to the housing.

7. A distributor according to claim 1 wherein the housing at the discharge opening is provided with an inclined deflector to deflect a portion of the discharge downwardly and centrally in respect to the distributor axis.

8. A distributor according to claim 7 wherein the deflector is laterally adjustable to control its effectiveness.

9. A distributor according to claim 1 wherein the lower portion of the housing below the impeller is conical and provided with apertures.

References Cited

UNITED STATES PATENTS 3,206,044   9/1965   Schwichtenberg _____ 214—17
3,209,925  10/1965   Coenen _____ 214—17
3,337,065   8/1967   Freeman _____ 214—17

ROBERT G. SHERIDAN, *Primary Examiner.*